United States Patent

Rivers, Jr.

[15] 3,695,471

[45] Oct. 3, 1972

[54] TRANSPORT VEHICLE

[72] Inventor: William C. Rivers, Jr., 2848 Village Grove Dr. South, Jacksonville, Fla. 32217

[22] Filed: May 15, 1970

[21] Appl. No.: 48,662

Related U.S. Application Data

[62] Division of Ser. No. 808,531, March 19, 1969, Pat. No. 3,561,621.

[52] U.S. Cl. .............214/515, 105/366 R, 211/49 D, 220/1.5, 220/23.4, 296/3
[51] Int. Cl. ................................................B60p 1/64
[58] Field of Search ..214/515; 296/35 A, 3; 220/1.5, 220/23.4; 211/49 R, 49 S, 49 D; 105/366 R

[56] References Cited

UNITED STATES PATENTS

| | | |
|---|---|---|
| 3,451,573 | 6/1969 | Josephian...................214/515 |
| 3,172,538 | 3/1965 | Fowler......................211/49 R |
| 3,398,850 | 8/1968 | Kennard..................220/1.5 X |
| 2,290,715 | 7/1942 | Shanahan et al. ..........220/1.5 |

*Primary Examiner*—Albert J. Makay
*Attorney*—Mason, Fenwick & Lawrence

[57] ABSTRACT

A transport vehicle having a load bed with upstanding guides defining container positions on the bed, and containers having downwardly converging pallet bottoms for automatic orienting at the container positions. The vehicle has an after deck carrying a load handling machine for loading and unloading containers, with a pivoted machine-loading ramp pivotally mounted on the after deck and movable to and from loading position by the load handling machine.

1 Claim, 7 Drawing Figures

INVENTOR
WILLIAM C. RIVERS, JR.

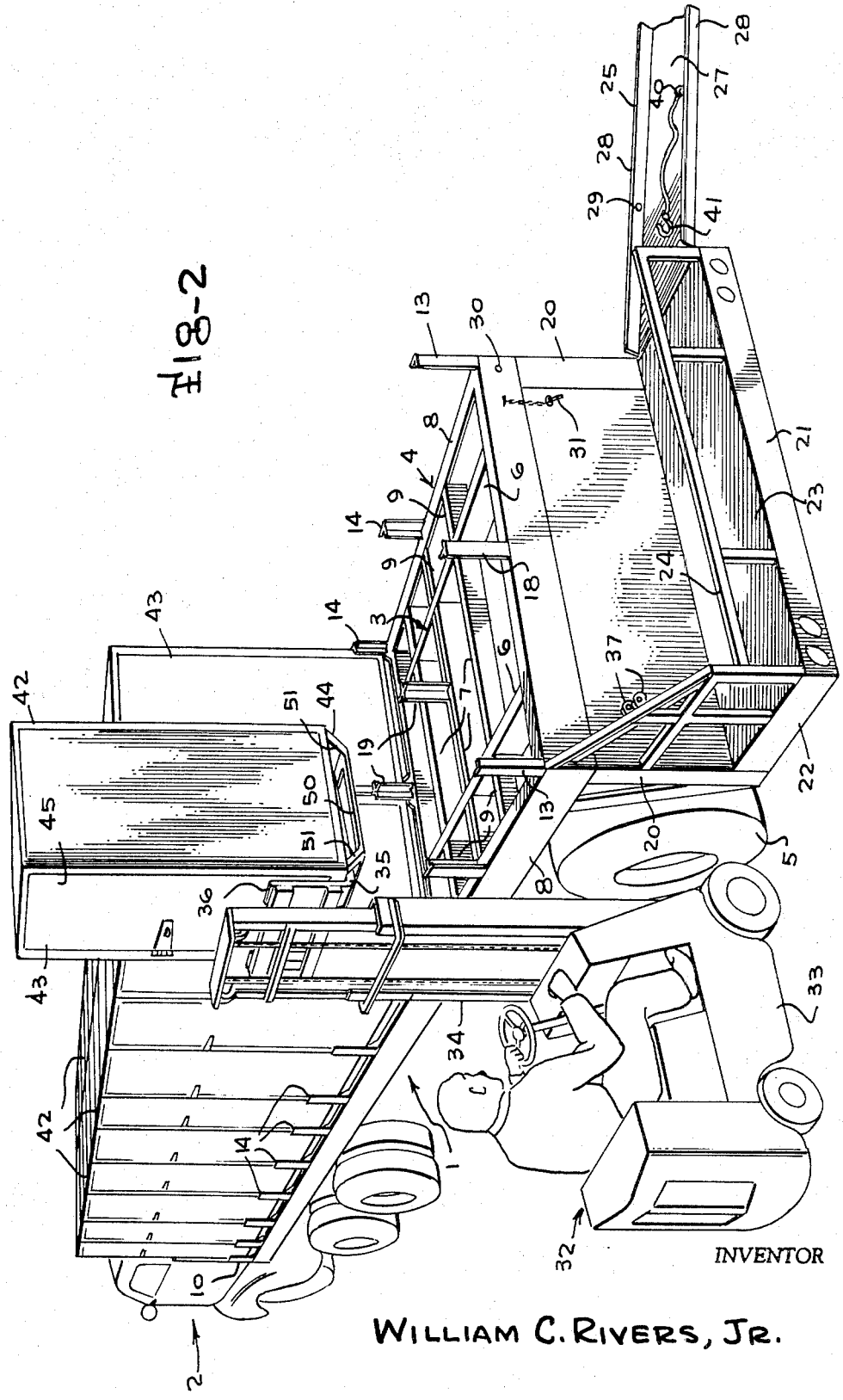

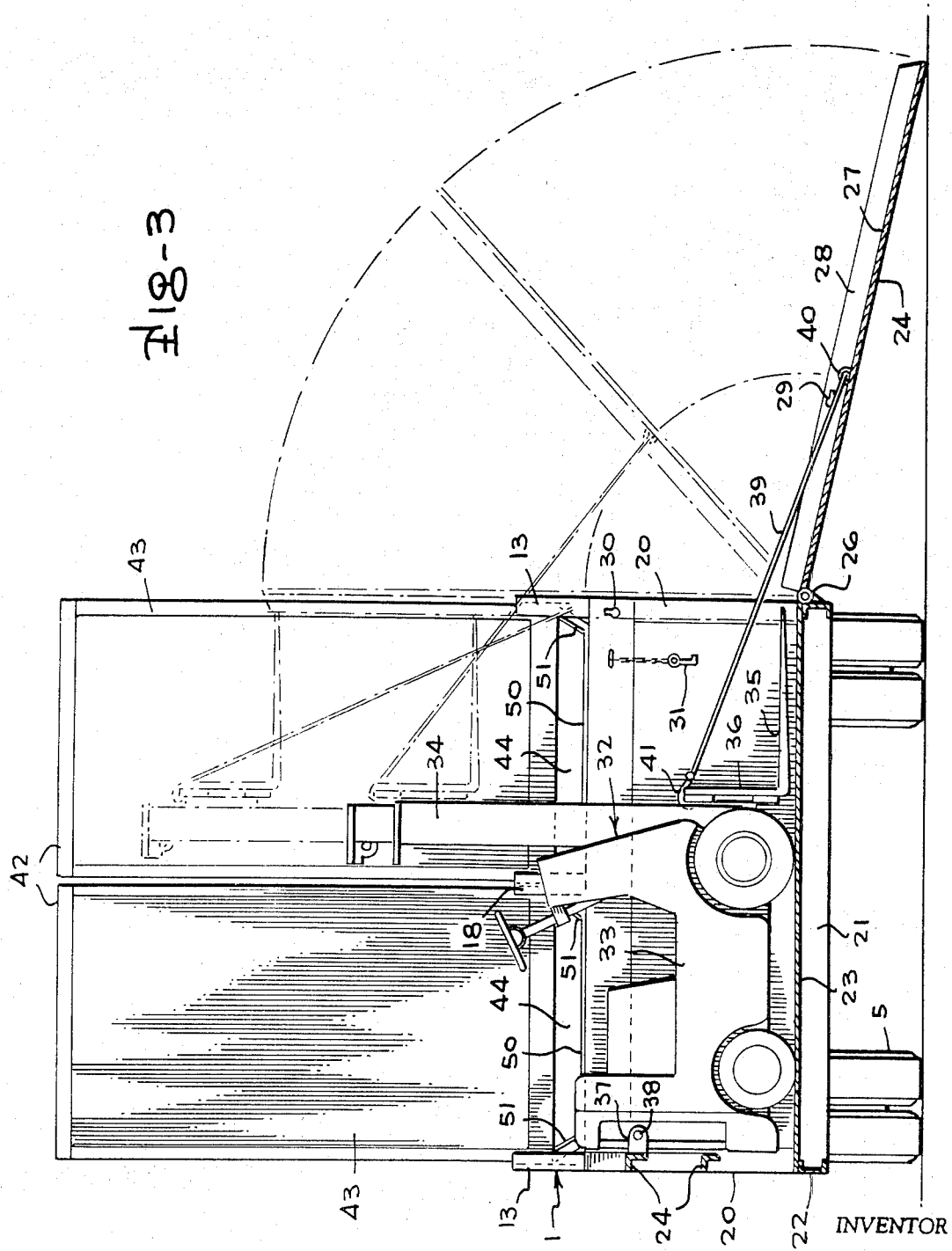

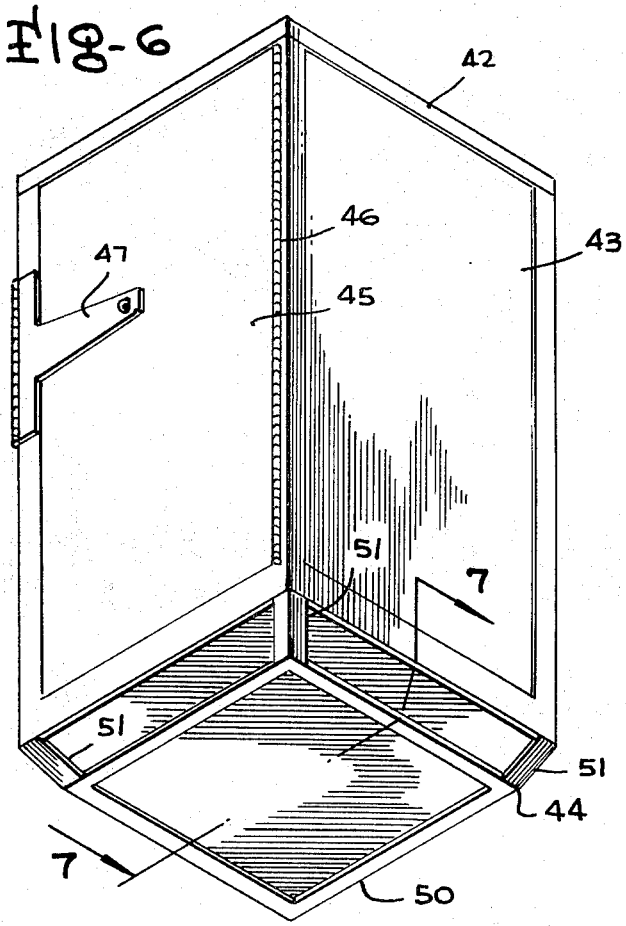
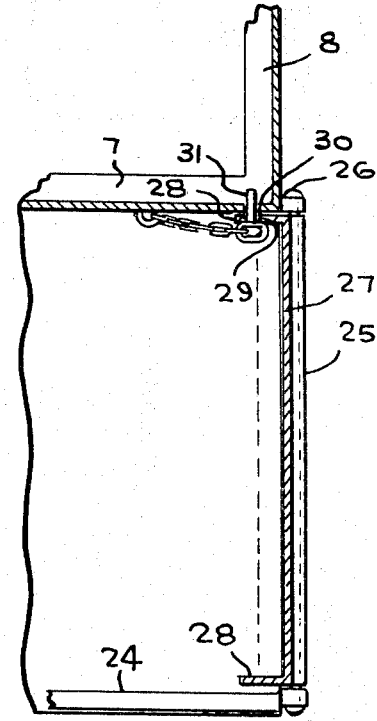
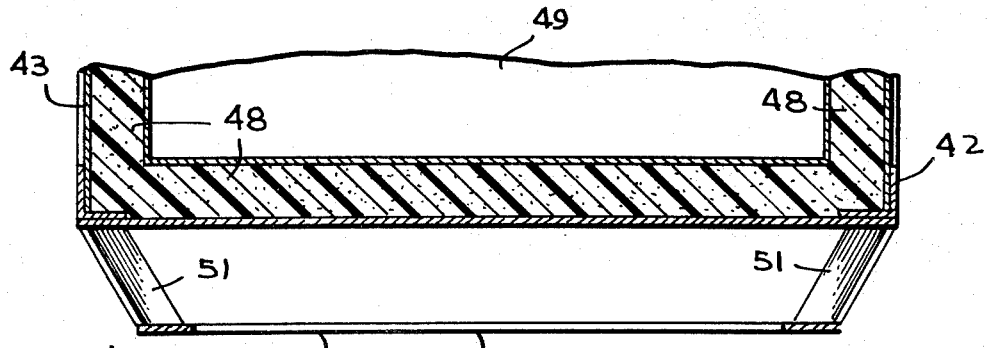

INVENTOR
WILLIAM C. RIVERS, JR.

though Pat. No. 3,695,471

TRANSPORT VEHICLE

REFERENCE TO PRIOR APPLICATION

This application is a division of co-pending application Ser. No. 808,531, filed Mar. 19, 1969, now Pat. No. 3,561,621 patented Feb. 9, 1971, TRANSPORT VEHICLE, William C. Rivers, Jr., inventor.

BACKGROUND OF THE INVENTION

This invention relates to transport vehicles, and particularly to vehicles for transporting products in containers of unit size which, when packed, are quite heavy.

It is becoming increasingly vital that goods be distributed from central depositories to scattered points of use as quickly and with as little help as possible. The rapid growth of chains of businesses, such as stores, restaurants, etc., has increased the problem. These chain organizations all operate with a central warehouse where quantity shipments are received, and distribution is made from the warehouses to the individual stores or restaurants.

It has been proposed to assemble and pack the deliveries for each store at the warehouse, so that the delivery man is required only to unload one or more packages of products at each store. In some instances, the goods, or products, are to be packed in containers of unit size, and, when the products are perishable, to be packed in insulated containers. This permits delivery by the warehouseman at any time, irrespective of the availability of help at the delivery point to unload the products from the transporting containers.

The size and weight of the unit containers has caused difficulty in handling during loading and unloading the transporting vehicle as well as the use of a number of men, or has required the presence of heavy equipment to handle the containers at each delivery point. This has retarded the commercial acceptance of the unit pack system.

SUMMARY OF THE INVENTION

The general object of the present invention is to provide a transporting vehicle which will eliminate the difficulties with present unit delivery systems and make possible practical delivery of very heavy unit containers by the driver of the vehicle without additional help.

A more specific object of the invention is to provide such a vehicle having predetermined locations for each unit container, with means to maintain the containers in position on the vehicle bed.

Another object is the provision of a transporting vehicle which has an auxiliary deck for carrying a load-handling machine, such as a fork lift, to be available at all delivery points.

A further object is to provide such a vehicle having a loading ramp on the auxiliary deck, with the load handling machine being used as a source of power for raising and lowering the ramp.

Still another object of the invention is to provide containers having their lower ends shaped to guide the containers to proper seats on the vehicle bed when the containers are lowered by the load handling machine carried by the transporting vehicle.

Other objects of the invention will become apparent from the following description of one practical embodiment there of, when taken in conjunction with the drawings which accompany, and form part of, this specification.

BRIEF DESCRIPTION OF THE DRAWINGS

FIG. 2 is also a perspective view of the trailer, the load handling machine being removed from its deck and in the process of lowering a container to its seat on the trailer bed;

FIG. 3 is a vertical section through the auxiliary deck with the load handling machine in place on the deck and the ramp being shown in full lines in lowered position and in dotted lines in raised position, the view being taken on line 3—3 of FIG. 1;

FIG. 4 is a horizontal section, taken on the line 4—4 of FIG. 1, illustrating the means for securing the ramp in raised position;

FIG. 6 is a perspective view of a unit container for use with the transporting vehicle, the container being viewed from below; and FIG. 7 is a partial vertical section through the container, taken on the line 7—7 of FIG. 6.

DESCRIPTION OF THE PREFERRED EMBODIMENT

Figure 1:
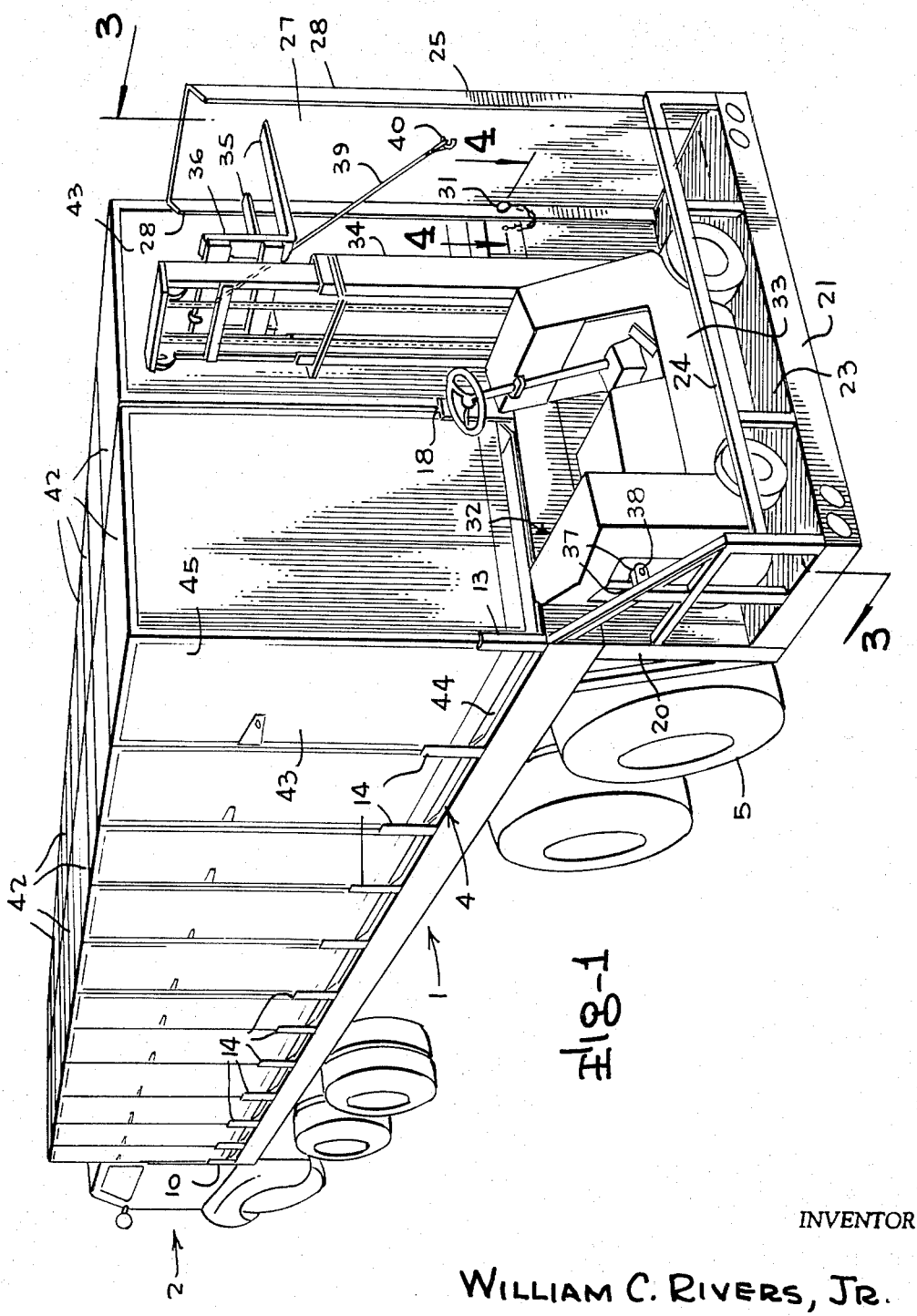
FIG. 1 is a perspective view of a tractor and trailer incorporating the principles of the present invention, the vehicle being viewed from the rear with the load handling machine in place on the auxiliary platform.
Figure 5:
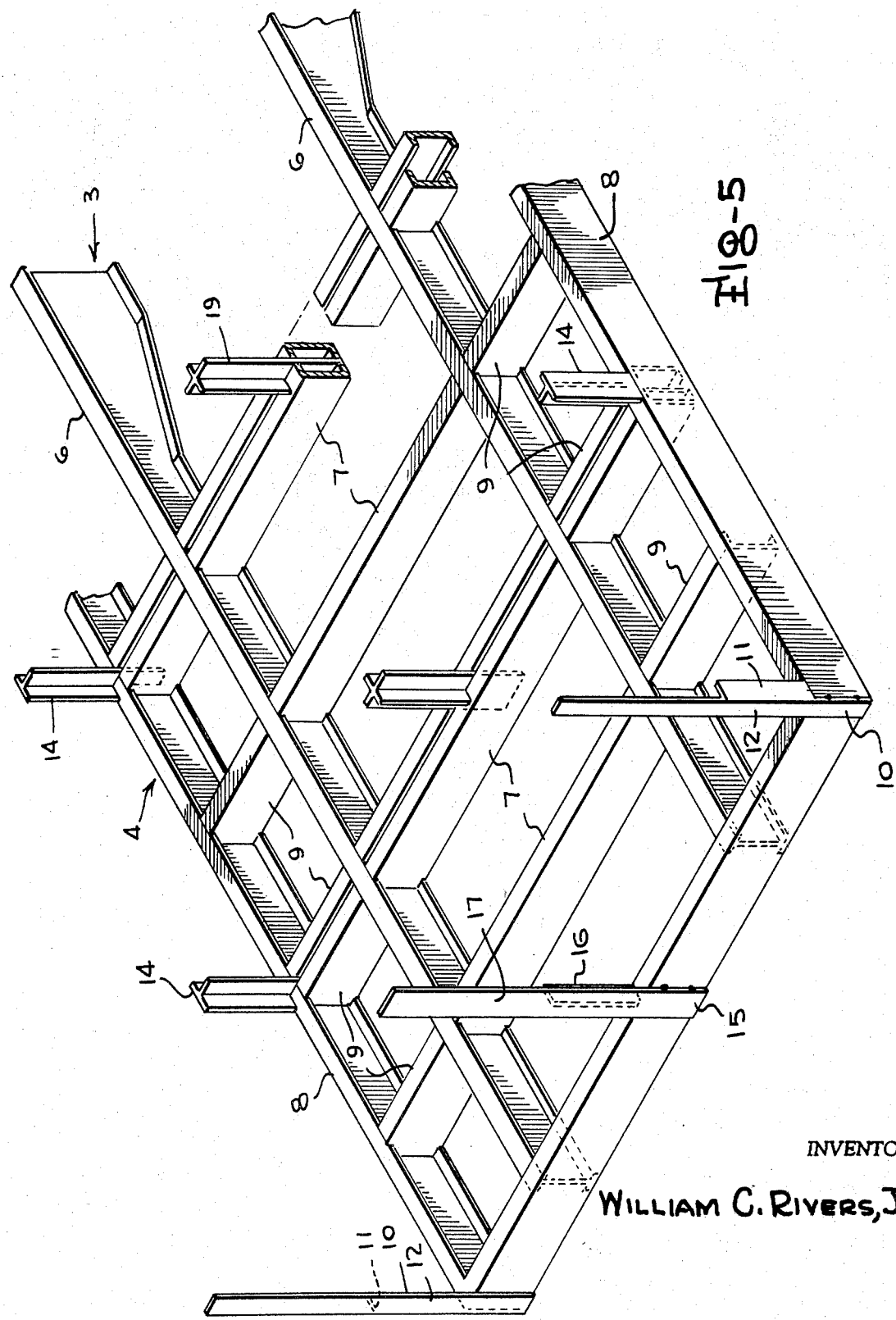
FIG 5. is a perspective view of a portion of the truck bed, showing the means for positioning, and holding, the unit containers on the bed.

As mentioned above, the invention relates to a transporting vehicle, here shown as a trailer 1 drawn by a conventional tractor 2. The trailer consists of the usual frame 3 and load supporting bed 4, with the frame being secured to the usual tandem wheel mount 5 adjacent the rear. The front of the trailer carries the usual kingpin for connection to the fifth wheel of the tractor (not shown).

The frame 3 is composed of longitudinally extending, transversely spaced frame members 6, held in space relation by means of transversely extending channels 7. Spaced outwardly from the frame members 6, and extending parallel to them, are the side rails 8 of the bed 4. These are supported upon additional channels 9 which form continuations of the channels 7. The frame together with the side rails and connecting channels form the load supporting bed 4.

At the forward corners of the bed there are vertically extending angle members 10 projecting above the surface of the load supporting bed. These members have their webs 11, which extend longitudinally of the bed 4, cut off at a predetermined distance above the bed surface, while the webs 12, which extend transversely of the bed 4, project a considerable distance upwardly beyond the upper edges of the webs 11. At the opposite, or rear, corners of the bed, there are vertical angle members 13 which have both webs of the same length, terminating at the same height above the bed as the short webs 11 of the angle members 10. At equally spaced points along the side rails 8, there are upwardly projecting T-members 14, which also rise to the height of the angle members 13. At the center of the front of the bed, there is a T-member 15 which has its longitudinally extending web 16 terminating at the height of the webs 11 of the angle members 10, while its web 17 extends upwardly to the height of the webs 12 of the angle members 10. There is an additional T-member 18 located at the center of the rear of the bed. This T-member has its webs terminate in the plane of the side T-members 14 and the rear angle members 13. Along the center of the bed, at equal distances apart, and in transverse alignment with the side T-members 14, there are a series of cruciform members 19. These members also terminate in the same horizontal plane as the side T-members 14. The members 10, 13, 14, 15, 18 and 19, collectively, form the corners of container positions on the bed, while adjacent webs of these members form angular guides to receive, and position, the containers properly upon the bed.

At the rear of the trailer bed, there are downwardly projecting posts 20 which serve to mount an auxiliary bed, or after-deck, 21. The deck has a suitable frame 22, on which is mounted a deck member 23. There is a rail 24 extending along the rear side and the street side of the after-deck, and the deck and the rail may be suitably braced from the trailer bed and frame. The after-deck extends the full width of the trailer bed, and on the curb side of the deck there is a ramp 25 pivotally connected along its underside, as at 26, to the deck 21. The ramp is shown as having a floor 27 with side bracing flanges 28. The flange 28 adjacent the trailer bed is provided with an opening 29, and the rearmost cross channel of the trailer bed has a matching opening 30, so that when the openings 29 and 30 are in alignment a locking key 31 may be inserted to hold the ramp in vertical position.

After deck 21 is used as a carrying means for a container handling machine, such as the small fork lift 32 shown in the drawings. The fork lift may be of any suitable type which is small enough to be carried on the after deck, the one illustrated being a mobile unit 33 having a telescopic mast 34 at its front carrying tracks to vertically guide a conventional fork 35 with the usual back plate 36. The fork lift is designed to move under its own power up the ramp 25 and onto the deck 23. In order to firmly anchor the fork lift in position on the after deck, some means such as the cars 37 may be provided on the street side portion of the rail 24 to receive an anchoring bolt 38 which can also extend through a suitable opening at the rear of the fork lift. The ramp 25 has a lifting cable 39 secured to it, as at 40, and the opposite end of the cable carries a hook 41, which is hooked over the top edge of the fork back plate 36 after the fork lift has been anchored on the after deck and the ramp is to be raised. By raising the fork in the normal manner, the ramp will be pulled up to vertical position, as shown in dotted lines in FIG. 3, whereupon the locking key 31 may be inserted through the openings 29 and 30 to lock the ramp in position. The fork will be left in its upper position so that it also forms a holding means for the ramp.

The trailer is adapted to receive a plurality of containers 42. These may have any desired construction, but to utilize the full load area they should be generally square or rectangular in cross section, and consist of a box-like body 43 mounted upon a pallet 44. The body may take any form, such as that shown in FIGS. 6 or 7, for example, wherein the body is an enclosure having an access door 45 through which the container can be loaded and unloaded. The door is pivoted at 46 along one edge, and a suitable securing hasp 47 may be used to hold the door in its closed position. The containers may have insulated walls 48, as shown, if perishable products are to be transported, and the interior storage space 49 may be entirely open or provided with shelves as desired.

The pallet 44 is shown as of skeletal form, comprising a bottom rectangular frame 50 with corner posts 51 connected to the bottom corners of the container body and holding the frame 50 spaced from the container body. The corner posts are inclined inwardly, so that the planes of the sides of the pallet defined by the corner posts taper inwardly. Thus, the bottom frame 50 is smaller than the bottom of the container body, and the inclined corner posts will form centering guides when in contact with the upwardly projecting, container positioning members of the pallet to lead the container into its proper position for seating within the rectangular area defined by the positioning members.

Normally, a complete set of containers will include three times the number of containers carried by the trailer under full load. For example, if the trailer carries 22 containers, as shown, there will be 66 containers in a full set. With this arrangement, the trailer may be loaded with 22 containers for delivery, (36) there may be 22 containers at the warehouse (37) for loading, for loading, and the remaining 22 containers will be scattered at the various delivery points for pick-up when the truck and trailer arrive with filled containers.

In use, the trailer loaded with its full complement of containers will be transported to the first delivery point. Upon arrival, the driver will go to the back of the trailer, remove locking key 31 from the openings 29 and 30 to release the after deck ramp, and start the fork lift 32. The operator will lower the fork 35 in the usual manner, which will allow the ramp 25 to swing about its pivot 26 and move to its lowered position shown in full lines in FIGS. 2 and 3. When the ramp is lowered, the operator will unhook the cable 39 from the fork back plate and remove the anchor bolt 38 holding the fork lift in place on the after deck. The fork lift can then be driven down the ramp and around to the side of the vehicle for removal of selected containers from the trailer. As the pallets of the containers are of skeletal form, the fork of the lift can be inserted between the bottom of the container body and the pallet base frame. It will be a simple matter to lift the container vertically until its bottom has cleared the tops of the positioning members, and then move the fork lift to transport the container to any desired position. After the containers for delivery at the particular location have been removed, the operator can then take empty containers and load them into the positions vacated by the full ones. In doing this, the empty container will be lifted and moved into the space left vacant by the removal of a filled container. The containers at one or both sides and at the back of the vacant space will serve as preliminary guides to roughly position the empty container. When the container has been moved into the space, it is lowered and the tapering pallet corner posts, upon contact with the positioning members, will cause whatever lateral shifting of a container as might be necessary to bring the container body corners directly in vertical alignment with the corner positioning means on the trailer. Thus, the container will be automatically led into is proper position. When the container is seated upon the trailer bed, the fork lift will be backed away from the trailer. It has been found that it is not necessary to provide locking means for the containers, as the locating and guiding angle members are sufficient to prevent shifting of the containers.

After all of the containers consigned to the particular location have been removed and empties have been put in their places, the operator will back the fork lift up the ramp 25 to its transporting position on the after deck. Anchoring bolt 38 will be put in place to securely hold the fork lift in position on the after deck. When the fork lift has been anchored the hook 41 on the cable 39 is attached to the fork back plate and the fork is raised to bring the ramp up to its vertical position. When in position the locking key 31 is inserted through the openings 29 and 30 to prevent accidental lowering of the ramp during transit. The operator is now ready to drive to the next delivery point.

After all of the deliveries have been made and the empty containers loaded onto the trailer, the trailer will be driven back to the warehouse where the empties can be unloaded and a new load of filled containers put onto the trailer. When loading an empty trailer, the operator can quickly locate the position of the first container by moving in toward the side of the vehicle at the front and bringing the side of the container into contact with the upwardly projecting web 12 of the front corner angle member and the projecting web 17 of the center T-member at the front. This will roughly position the first container so that its tapering pallet can bring it into exact position as it is lowered. The loading of subsequent containers will be simplified by merely bringing them into juxtaposition with others already loaded. In each case, the final positioning will be automatically done by means of the tapering pallet camming on the upstanding positioning members.

The extensions of the webs 12 and 17 of the members 10 and 15 also provide increased support for the containers against tilting displacement forwardly when the vehicle is stopped suddenly. With the proposed system of handling material in containers of unit size, and the disclosed transporting vehicle, it is possible for deliveries to be made over a wide area by a single driver. The unit containers can be quite heavy for the operator has his own lift handling machine with him at all times. The load handling machine is capable of being self-loaded and unloaded, and it supplies the power for handling the ramp used in loading and unloading. The fork lift, after being anchored to the after deck, also forms the primary means for holding the ramp in its elevated position during transit from one delivery point to another. The loading and unloading of the containers is simplified for the one-man operation, by including cooperating means between the container and the means for holding it in position on the transporting vehicle to automatically guide the container to a proper seat on the vehicle. The operator need only make the preliminary positioning of the container and then lower it to have precision locating of each of the containers making up the total load. There is no heavy lifting or other difficult manual operation required of the single operator of the vehicle.

I claim:

1. In a transport vehicle having a load supporting bed, the improvement comprising, container positioning means carried by the bed and dividing the bed into a plurality of rectangular container receiving areas, each container positioning means rising vertically from the bed and having angularly spaced flanges defining a corner of a container receiving area with a positioning means at each corner of each receiving area, vertical containers of the same horizontal cross-sectional shape as the container receiving areas removably seated on the bed in the container receiving areas with each vertical edge of each container being fitted within the angularly spaced flanges of one of the container positioning means wherein the container positioning means are located at the corners, along the sides and ends, and intermediate the sides and ends of the load supporting bed, the container positioning means being arranged in rows longitudinally and transversely of the load supporting bed, the container positioning means at the corners of the bed being right angular in horizontal cross-section, the container positioning means along the sides and ends of the bed being T-shaped in horizontal cross-section, and the intermediate container positioning means being cruciform in horizontal cross-section.

* * * * *